United States Patent
Yanagawa

(10) Patent No.: US 9,831,029 B2
(45) Date of Patent: Nov. 28, 2017

(54) POWER TRANSMISSION DEVICE, POWER TRANSMISSION METHOD, AND STORAGE MEDIUM

(71) Applicant: CANON KABUSHIKI KAISHA, Tokyo (JP)

(72) Inventor: Katsuhiko Yanagawa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 905 days.

(21) Appl. No.: 14/248,161

(22) Filed: Apr. 8, 2014

(65) Prior Publication Data

US 2014/0306547 A1 Oct. 16, 2014

(30) Foreign Application Priority Data

Apr. 12, 2013 (JP) ................................. 2013-084240

(51) Int. Cl.
| | |
|---|---|
| H01F 38/00 | (2006.01) |
| H01F 38/14 | (2006.01) |
| H02J 50/10 | (2016.01) |
| H02J 50/80 | (2016.01) |

(52) U.S. Cl.
CPC .............. *H01F 38/14* (2013.01); *H02J 50/10* (2016.02); *H02J 50/80* (2016.02)

(58) Field of Classification Search
CPC ............. H02J 5/005; H02J 50/10; H02J 50/80
See application file for complete search history.

(56) References Cited

U.S. PATENT DOCUMENTS

| | | | |
|---|---|---|---|
| 9,106,096 B2* | 8/2015 | Kato | H02J 7/025 |
| 9,203,464 B2* | 12/2015 | Kim | H04B 1/707 |
| 2014/0142876 A1* | 5/2014 | John | H01F 38/14 |
| | | | 307/104 |

FOREIGN PATENT DOCUMENTS

| | | |
|---|---|---|
| JP | 2006-230129 A | 8/2006 |
| JP | 2006-238548 A | 9/2006 |
| JP | 2009-136132 A | 6/2009 |
| JP | 2012-191721 A | 10/2012 |
| JP | 2012-205379 A | 10/2012 |
| JP | 2012-210056 A | 10/2012 |
| JP | 2013-090483 A | 5/2013 |

* cited by examiner

*Primary Examiner* — Hai L Nguyen

(74) *Attorney, Agent, or Firm* — Canon U.S.A., Inc. IP Division

(57) ABSTRACT

A power transmission device that wirelessly supplies power with a power receiving device includes a power transmission unit configured to wirelessly transmit power to a power receiving device, a receiving unit configured to receive a receiving power amount from the power receiving device, an evaluation unit configured to compare a reference value of the power receiving device and the receiving power amount and evaluate a transmission efficiency of power to the power receiving device based on a comparison result, and a transmission unit configured to transmit an evaluation result by the evaluation unit to the power receiving device.

6 Claims, 24 Drawing Sheets

FIG.7

| DEVICE ID | CURRENT VALUE | MAXIMUM VALUE |
|---|---|---|
| 43B2E950 | 450mW | 500mW |
| 62B5DC6F | 280mW | 300mW |
| 16B5C9D6 | 330mW | 600mW |
|  |  |  |
|  |  |  |
|  |  |  |

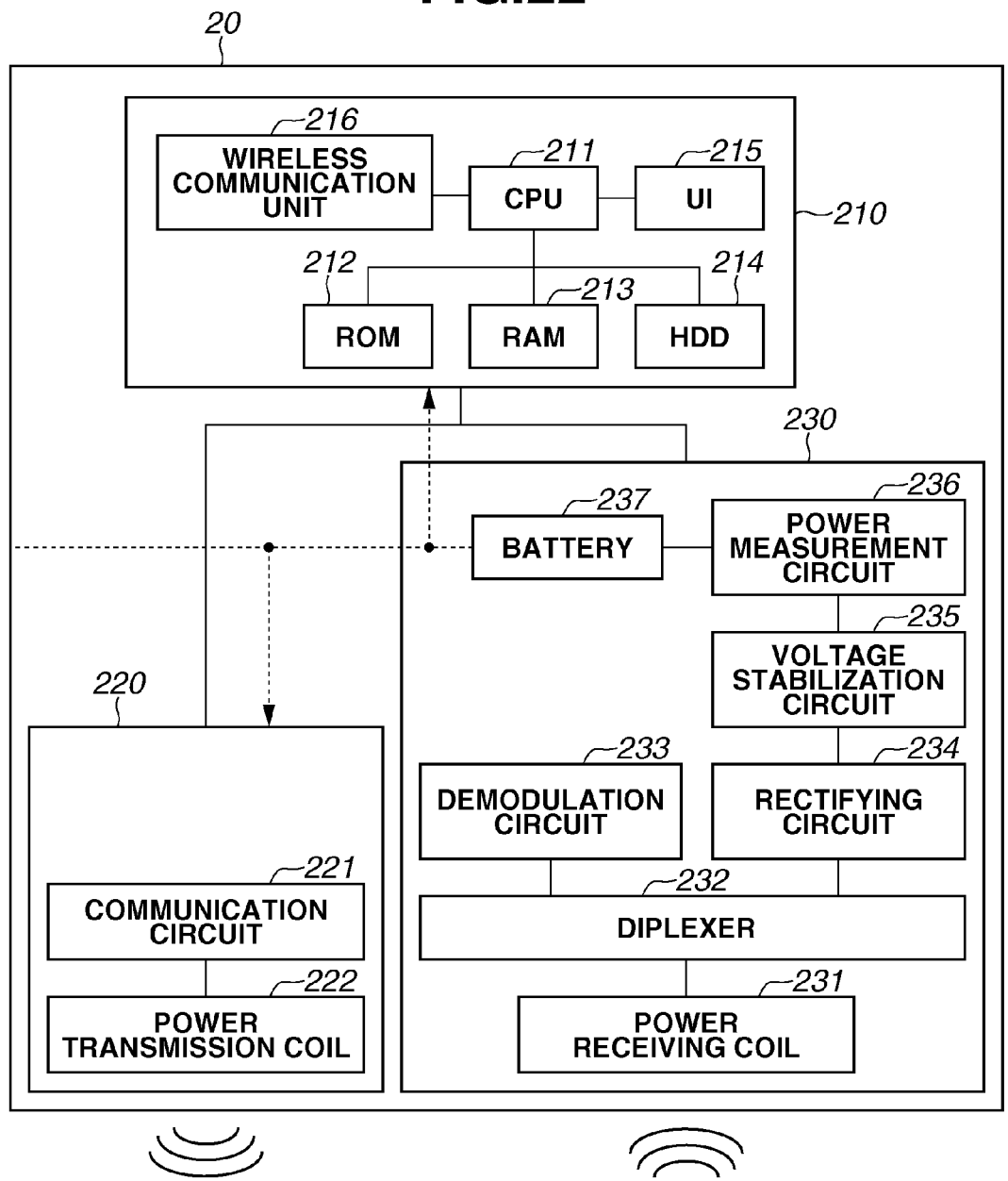

POWER TRANSMISSION DEVICE, POWER TRANSMISSION METHOD, AND STORAGE MEDIUM

BACKGROUND

Field

Aspects of the present invention generally relate to a power transmission device, a power transmission method, and a storage medium.

Description of the Related Art

Conventionally, a technique for supplying power in a non-contact manner (wirelessly) has been known. Examples of systems for supplying power in a non-contact manner include four systems: an electromagnetic induction system, a magnetic field resonance system, an electric field coupling system, and a radio wave reception system. Among these systems, the magnetic field resonance system is characterized in that it can transmit a sufficiently large amount of power with a long transmission distance. Consequently, among these four systems, the magnetic field resonance system has drawn particular attention. In the magnetic field resonance system, there has been proposed a "1-to-N" power supply system in which a power transmission device performs wireless power transmission to a plurality of power receiving devices, taking advantage of this long power transmission distance (refer to Japanese Patent Application Laid-Open No. 2009-136132, for example).

In the technique discussed in Japanese Patent Application Laid-Open No. 2009-136132, a power transmission device transmits a certain pulse signal while it is in a standby mode where the power transmission device does not supply power, to search for any power receiving device approaching the power transmission device within several meters therefrom. If any power receiving device transmits its unique ID to the power transmission device, the power transmission device determines whether the transmission source of the unique ID is a power supply target power receiving device. If the power receiving device is a power supply target, the power transmission device supplies power to that power receiving device. At the time, the power transmission device can transmit a unique code to the wireless power receiving device to individually receive an amount of charge and a state of the device from the wireless power receiving device.

The power transmission area within which power can be transmitted from a power transmission device is limited. Therefore, in a case of a portable power receiving device, when the power transmission device transmits power to the power receiving device, the user has to move the power receiving device into the power transmission area. Further, even if the power receiving device is within the power transmission area, an obstacle between the power transmission device and the power receiving device may block power to the power transmission device.

However, it is difficult for the user to determine to which position the power receiving device has to be moved in order to improve the power transmission efficiency. Consequently, in some cases, power transmission is performed in a low transmission efficiency state, so that there has been the problem of wasteful power consumption.

SUMMARY

An aspect of the present invention is generally directed to a power transmission device capable of reducing wasteful power consumption.

According to an aspect of the present invention, a power transmission device includes a power transmission unit configured to wirelessly transmit power to a power receiving device, a receiving unit configured to receive a receiving power amount from the power receiving device, an evaluation unit configured to compare a reference value of the power receiving device and the receiving power amount and evaluate a transmission efficiency of power to the power receiving device based on a comparison result, and a transmission unit configured to transmit an evaluation result by the evaluation unit to the power receiving device.

Further features of the present disclosure will become apparent from the following description of exemplary embodiments with reference to the attached drawings.

BRIEF DESCRIPTION OF THE DRAWINGS

FIG. 7 illustrates an example of a management table.
FIG. 22 illustrates a power receiving device.

DESCRIPTION OF THE EMBODIMENTS

Various exemplary embodiments will be described in detail below with reference to the drawings.

Figure 1:
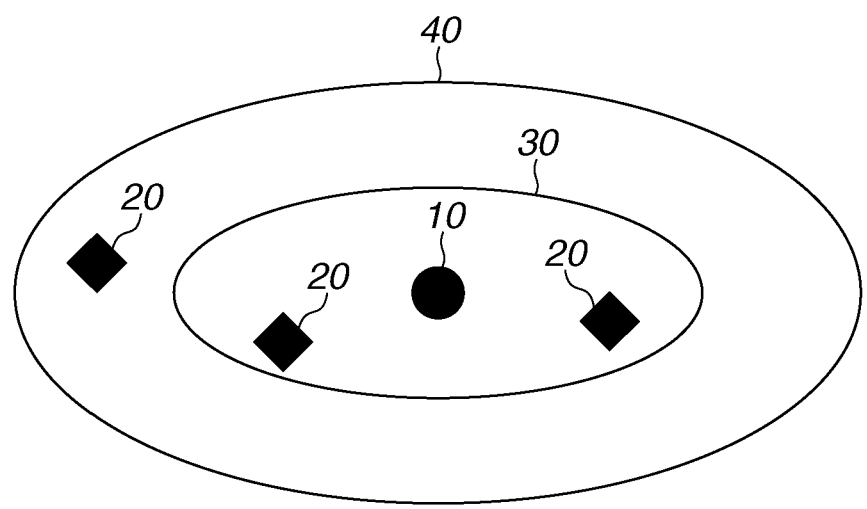
FIG. 1 illustrates a power transmission system.

FIG. 1 illustrates a power transmission system. The power transmission system includes a power transmission device 10 and a plurality of power receiving devices 20. The power transmission device 10 wirelessly supplies power to the power receiving devices 20. Further, the power transmission device 10 communicates data required for power supply with the power receiving devices 20. The power receiving devices 20 wirelessly receive power from the power transmission device 10. Further, the power receiving devices 20 communicate data required for power supply with the power transmission device 10.

A power supply area 30 illustrated in FIG. 1 is an area in which power can be supplied from the power transmission device 10 to the power receiving devices 20. The power supply area 30 is a range determined based on the power transmission capacity of the power transmission device 10. A communication area 40 is an area in which data communication can be executed between the power transmission device 10 and the power receiving devices 20.

The relationship between the power supply area 30 and the communication area 40 will now be described. The communication area 40 is a wider area than the power supply area 30. Specifically, the power supply area 30 is included within the communication area 40. As illustrated in FIG. 1, if there is a plurality of power receiving devices 20 in the power supply area 30, the power transmission device 10 can wirelessly supply power to the plurality of the power receiving devices 20 in parallel.

Figure 2:
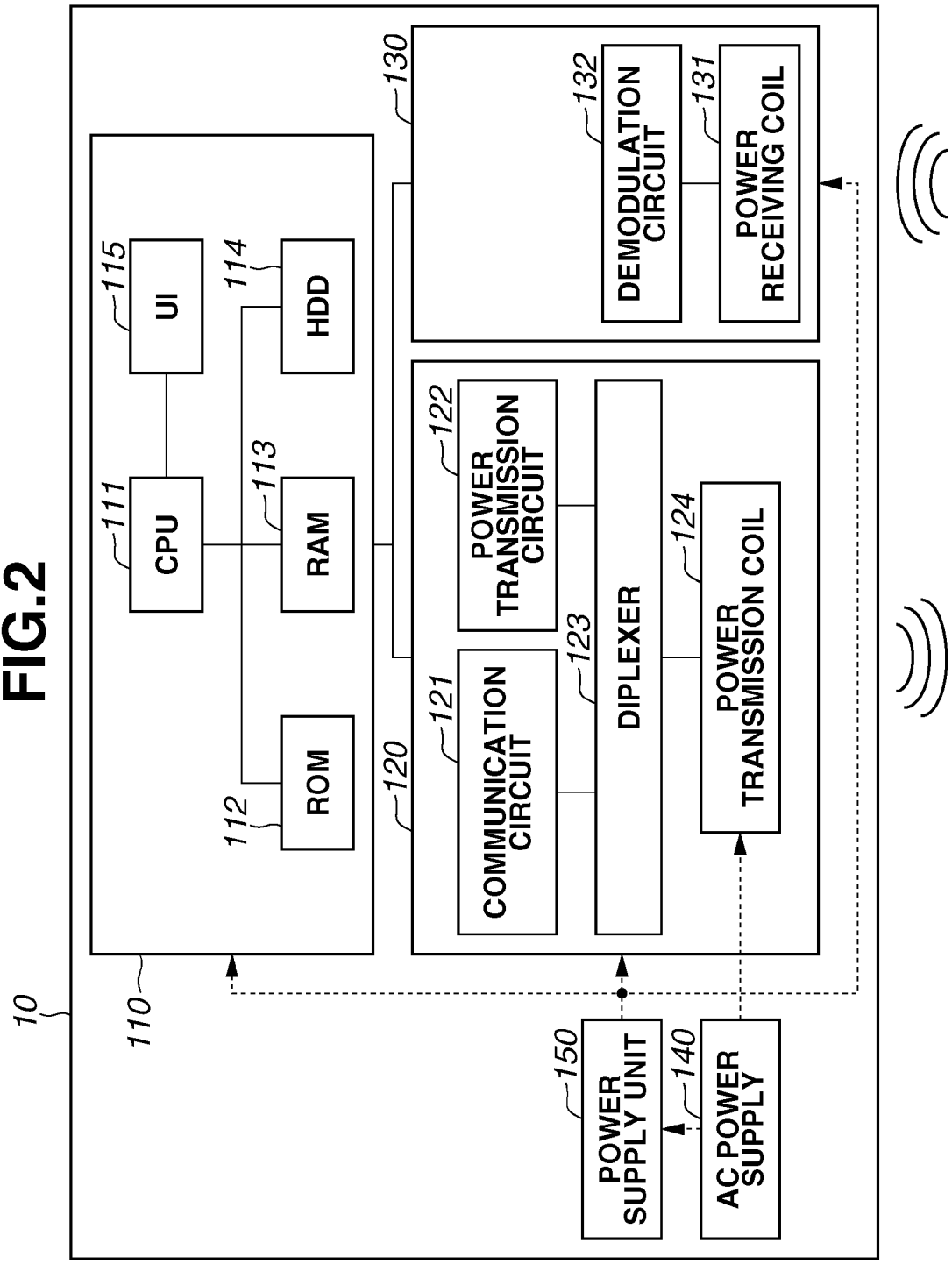
FIG. 2 illustrates a power transmission device.

FIG. 2 illustrates a power transmission device. In FIG. 2, solid lines indicate the exchange of data, and broken lines indicate the supply of power. The power transmission device 10 includes a control unit 110, a wireless transmission unit 120, a wireless receiving unit 130, an alternating current (AC) power supply 140, and a power supply unit 150. The control unit 110 controls the power transmission device 10. The control unit 110 includes a central processing unit (CPU) 111, a read-only memory (ROM) 112, a random-access memory (RAM) 113, a hard disk drive (HDD) 114, and a user interface (UI) 115. The control unit 110 is connected to the wireless transmission unit 120 and the wireless receiving unit 130 via an internal bus.

The CPU 111 processes various types of data and controls the power transmission device 10. The ROM 112, which is a non-volatile storage medium, stores a boot program used by the CPU 111. The RAM 113, which is a volatile storage medium, temporarily stores data and a program used by the CPU 111. The HDD 114, which is a non-volatile storage medium, stores an operating system (OS) and an application used by the CPU 111. The UI 115 is an operation input unit configured to receive an operation input from a user. The UI 115 also acts as a display unit that displays various types of information. The UI 115 may have, for example, a liquid crystal display unit and a touch panel. Further, pressing of the touch panel is detected by the CPU 111.

The wireless transmission unit 120 wirelessly transmits power to the power receiving device 20. The wireless transmission unit 120 includes a communication circuit 121, a power transmission circuit 122, a diplexer 123, and a power transmission coil 124. The communication circuit 121 generates a modulation signal for communication. The power transmission circuit 122 generates a modulation signal for transmitting power.

The diplexer 123 combines the modulation signal generated by the communication circuit 121 and the modulation signal generated by the power transmission circuit 122. The power transmission coil 124 transmits the modulation signal combined by the diplexer 123 to the power receiving device 20.

The wireless receiving unit 130 receives data from the power receiving device 20. The wireless receiving unit 130 includes a power receiving coil 131 and a demodulation circuit 132. The power receiving coil 131 receives from the power receiving device 20 a modulation signal for communication. The demodulation circuit 132 demodulates the modulation signals received by the power receiving coil 131.

The AC power supply 140 supplies an alternating current voltage to the power transmission coil 124 and the power supply unit 150. The power supply unit 150 converts the alternating current voltage supplied by the AC power supply 140 into a direct current voltage, and supplies the converted direct current voltage to the control unit 110, the wireless transmission unit 120, and the wireless receiving unit 130.

The processing performed by the power transmission device 10 and functions thereof, which will be described below, are realized by the CPU 111 reading a program stored in the ROM 112 or the HDD 114, and executing that program.

Figure 3:
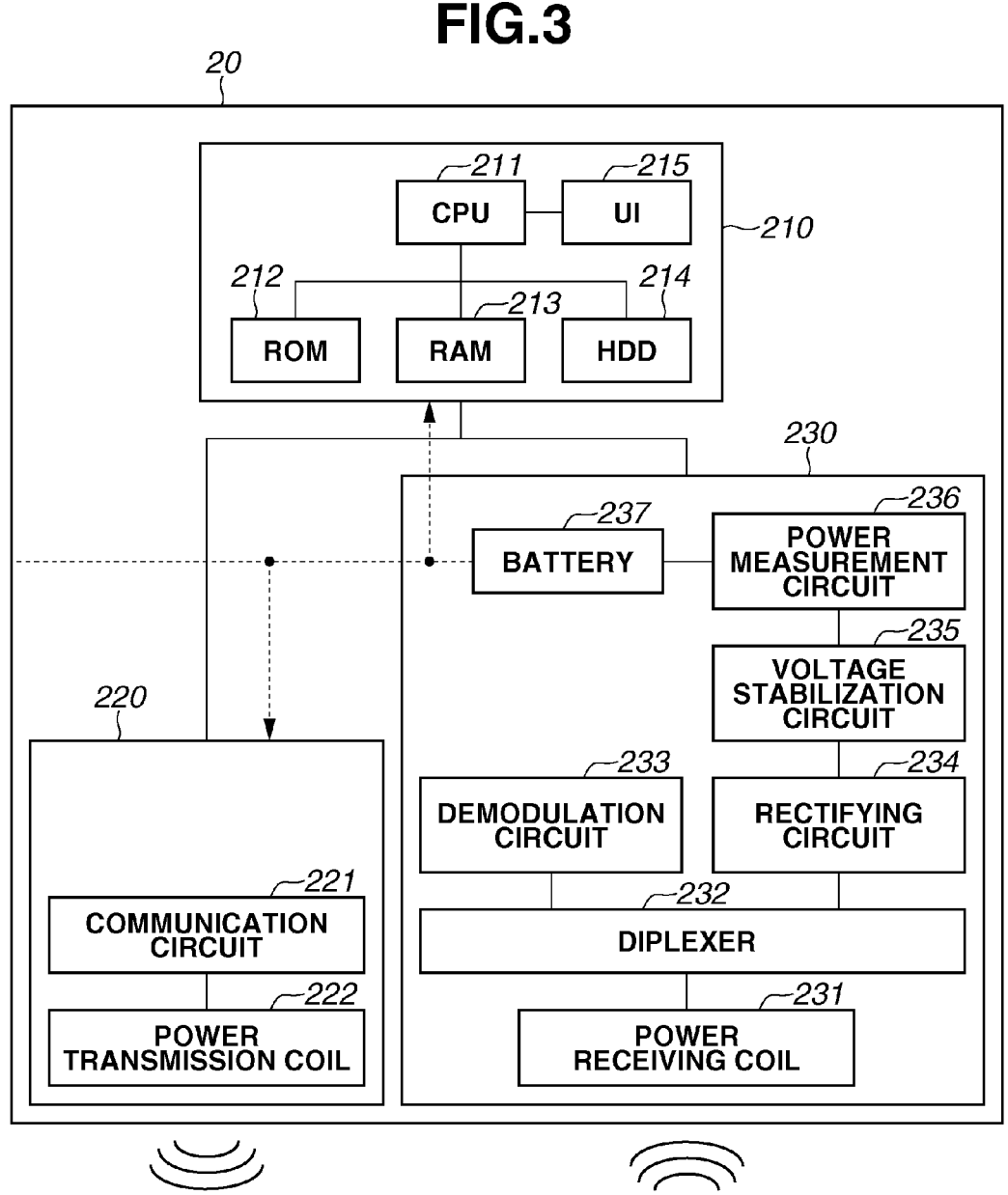
FIG. 3 illustrates a power receiving device.

FIG. 3 illustrates the power receiving device 20. In FIG. 3, solid lines indicate the exchange of data, and broken lines indicate the supply of power. The power receiving device 20 includes a control unit 210, a wireless transmission unit 220, and a wireless receiving unit 230. The control unit 210 controls the power receiving device 20. The control unit 210 includes a CPU 211, a ROM 212, a RAM 213, HDD 214, and a UI 215. The control unit 210 is connected to the wireless transmission unit 220 and the wireless receiving unit 230 via an internal bus.

The CPU 211 processes various types of data and controls the power receiving device 20. The ROM 212, which is a non-volatile storage medium, stores a boot program used by the CPU 211. The RAM 213, which is a volatile storage medium, temporarily stores data and a program used by the CPU 211. The HDD 214, which is a non-volatile storage medium, stores an operating system (OS) and an application used by the CPU 211. The UI 215 displays various types of information to the user, and receives various instructions from the user.

The wireless transmission unit 220 transmits data to the power transmission device 10. The wireless transmission unit 220 includes a communication circuit 221 and a power transmission coil 222. The communication circuit 221 generates a modulation signal for communication. The power transmission coil 222 transmits the modulation signal generated by the communication circuit 221 to the power transmission device 10.

The wireless receiving unit 230 wirelessly receives power from the power transmission device 10. The wireless receiving unit 230 includes a power receiving coil 231, a diplexer 232, a demodulation circuit 233, a rectifying circuit 234, a voltage stabilization circuit 235, a power measurement circuit 236, and a battery 237. The power receiving coil 231 receives a modulation signal from the power transmission device 10. The diplexer 232 separates the modulation signal received by the power receiving coil 231 into a modulation signal for communication, and a modulation signal for transmitting power.

The demodulation circuit 233 demodulates the modulation signal for communication separated by the diplexer 232. The rectifying circuit 234 generates a direct current voltage by rectifying the modulation signal for transmitting power separated by the diplexer 232. The voltage stabilization circuit 235 stabilizes the direct current voltage generated by the rectifying circuit 234. The power measurement circuit 236 measures the power of the stabilized direct current power supply generated by the voltage stabilization circuit 235. The battery 237 accumulates power by receiving the voltage stabilized by the voltage stabilization circuit 235. Further, the battery 237 supplies a direct current voltage to the control unit 210, the wireless transmission unit 220, and the wireless receiving unit 230 based on the accumulated power.

The processing performed by the power receiving device 20 and functions thereof, which will be described below, are realized by the CPU 211 reading a program stored in the ROM 212 or the HDD 214, and executing that program.

Figure 4:
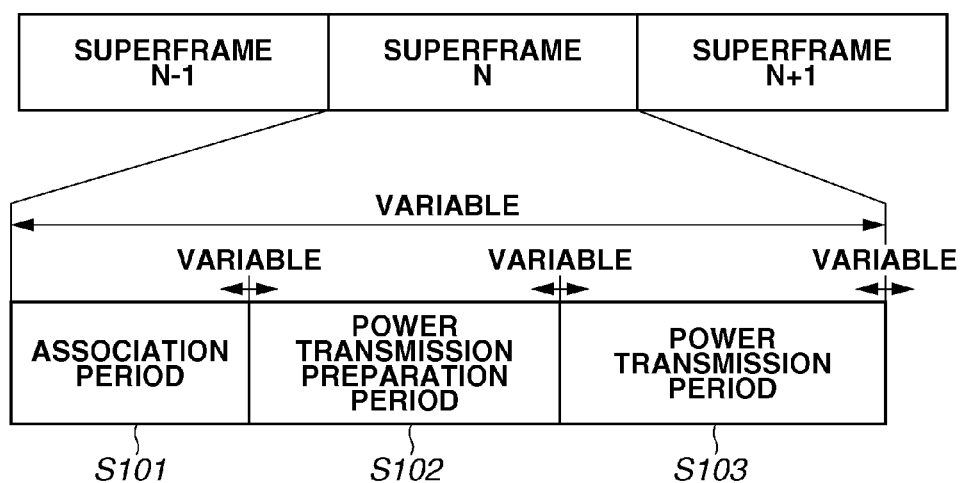
FIG. 4 illustrates an example of a superframe.

FIG. 4 illustrates an example of a superframe. In the wireless power transmission system according to a first exemplary embodiment, such a superframe is repetitively used to perform power transmission processing. Each single superframe includes step S101 (association period), step S102 (power transmission preparation period), and step S103 (power transmission period). Each of these periods is variable.

In step S101, the power transmission device 10 requests the power receiving device 20 for a device ID, and confirms the necessity of power. If the power transmission device 10 receives from the power receiving device 20 the device ID and information indicating that power is necessary, the processing proceeds to step S102. Further, the timing at which the processing proceeds from steps S101 to S102 is also variable.

In step S102, the power transmission device 10 can transmit a data request to the power receiving device 20. The power transmission device 10 can request the device ID of the power receiving device 20 in the data request. Further, the power receiving device 20 can transmit an acknowledgement as a response to the data request from the power transmission device 10. In response to the device ID request, the power receiving device 20 transmits an acknowledgement including the device ID. Each of response frames and acknowledgment frames is variable in length. When step S102 is completed, the processing proceeds to step S103. Further, the timing at which the processing proceeds from steps S102 to S103 is also variable.

In step S103, the power transmission device 10 transmits power to the power receiving device 20. In step S103, the power receiving device 20 can transmit a frame to the power transmission device 10 even if the power receiving device 20 does not receive a request frame from the power transmission device 10.

Figure 5:
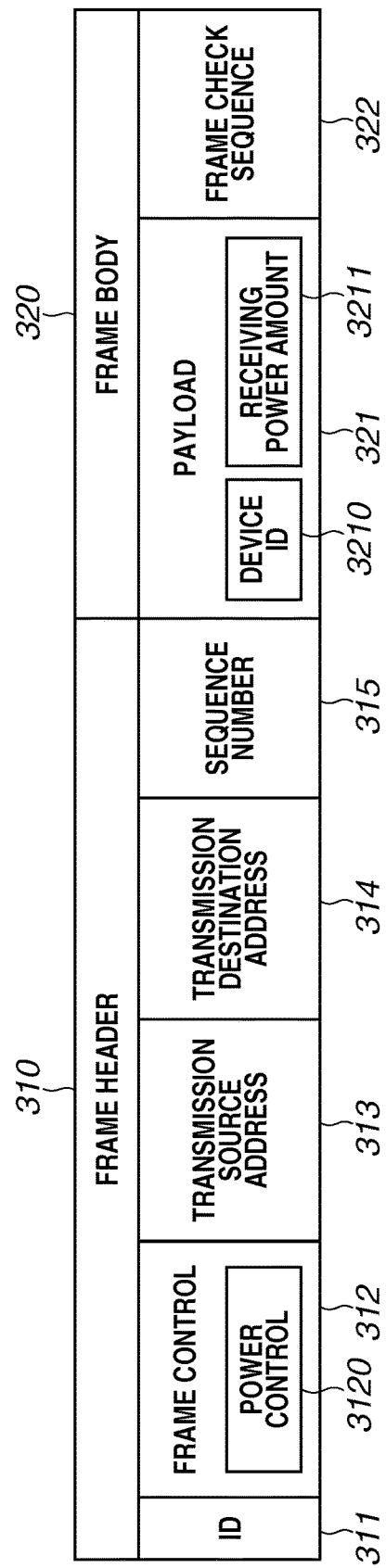
FIG. 5 illustrates an example of a frame format.

FIG. 5 illustrates an example of a frame format. In the above-described superframe, data communication is realized using a packet of a frame format illustrated in FIG. 5. Based on this data communication, the data required to start wireless power supply is transmitted and received.

A frame header 310 indicates the data transmission destination and the like. The frame header 310 includes an ID 311, a frame control 312, a transmission source address 313, a transmission destination address 314, and a sequence number 315. The ID 311 is an ID used when data communication is performed by the power transmission system.

The frame control 312 represents information for exchanging data of the power receiving device 20. The frame control 312 includes a power control 3120. The power control 3120 represents data for confirming the necessity of power. The transmission source address 313 is an address of the transmission source from which data is transmitted. The transmission destination address 314 is an address of transmission destination to which data is transferred. The sequence number 315 is a frame number.

A frame body 320 represents information about a data main body to be transferred as data. The frame body 320 includes a payload 321 and a frame check sequence 322. The payload 321 represents the data main body. A device ID 3210 and a receiving power amount 3211, for example, are allocated to the payload 321. The device ID 3210 represents identification information about the power receiving device 20. The receiving power amount 3211 represents information indicating the amount of power received by the power receiving device 20 from the power transmission device 10. The frame check sequence 322 represents data for performing an error check of the payload 321.

Figure 6:
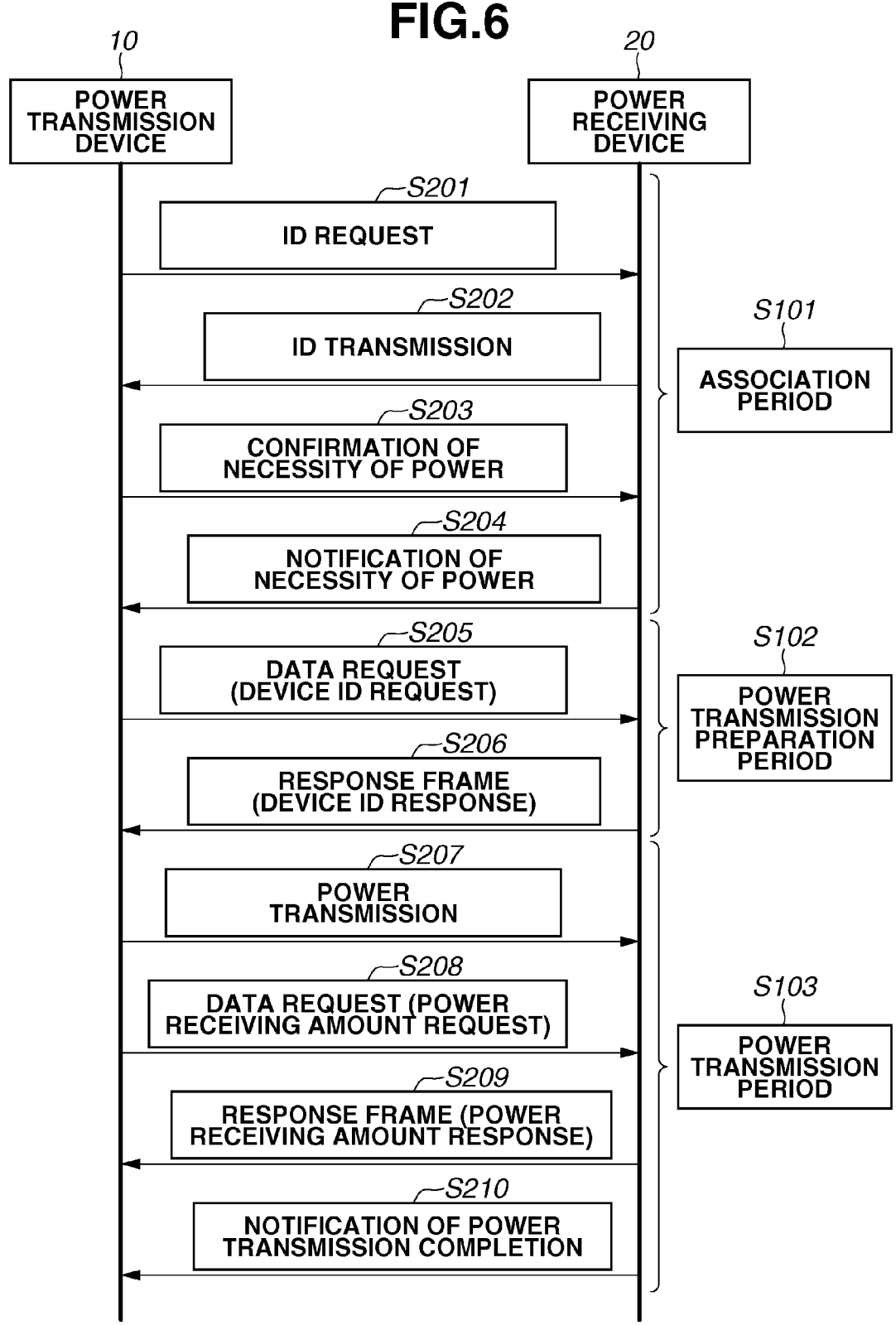
FIG. 6 is a sequence diagram illustrating power transmission processing.

FIG. 6 is a sequence diagram illustrating power transmission processing between the power transmission device 10 and the power receiving device 20 in the superframe. In the above-described superframe, data communication for wireless power transmission is realized by performing the following processing.

In step S201, the power transmission device 10 requests the power receiving device 20 for the ID. At this point, the power transmission device 10 uses the ID 311 of the frame format.

Next, in step S202, the power transmission device 10 receives the ID from the power receiving device 20. At this point, the power transmission device 10 uses the ID 311 of the frame format. Next, in step S203, the power transmission device 10 confirms whether the power receiving device 20 requires power. At this point, the power transmission device 10 uses the power control 3120 of the frame format. Next, in step S204, if the power receiving device 20 requires the power, the power receiving device 20 notifies the power transmission device 10 of the necessity of power. At this point, the power receiving device 20 uses the power control 3120 of the frame format.

Further, in step S204, if power is unnecessary, the power receiving device 20 notifies the power transmission device 10 that power is unnecessary. At this point, the power receiving device 20 uses the power control 3120 of the frame format. Then, the power transmission device 10 determines a power transmission target power receiving device 20 based on the response result of the necessity of power. Next, in step S205, the power transmission device 10 requests the power receiving device 20 for the device ID as a data request. At this point, the power transmission device 10 uses the device ID 3210 of the frame format.

Next, in step S206, the power receiving device 20 transmits the device ID to the power transmission device 10 as a response frame. At this point, the power receiving device 20 uses the device ID 3210 of the frame format.

Next, in step S207, the power transmission device 10 performs power transmission to the power receiving device 20. Then, in step S208, the power transmission device 10 requests the power receiving device 20 for the receiving power amount as a data request. At this point, the power transmission device 10 uses the receiving power amount 3211 of the frame format. Next, in step S209, the power receiving device 20 transmits the receiving power amount as a response frame to the power transmission device 10. At this point, the power receiving device 20 uses the receiving power amount 3211 of the frame format.

Next, in step S210, if the battery 237 is fully charged, the power receiving device 20 notifies the power transmission device 10 of power transmission completion. At this point, the power receiving device 20 uses the power control 3120 of the frame format. Thus, one superframe is completed. In this way, data communication for wireless power transmission is realized by performing data transmission and reception processing within a superframe.

FIG. 7 illustrates an example of a management table managed by the power transmission device 10. A management table 700 illustrated in FIG. 7 is generated in the HDD 114, and managed by the CPU 111. Further, as another example, the management table 700 may be stored in a non-volatile memory device such as a flash memory.

The management table 700 records history information about past power transmission by the power transmission device 10. Specifically, the management table 700 associates and stores a device ID 701, a current value 702, and a maximum value 703. The device ID 701 is a device ID of a power receiving device 20. The device ID 3210 allocated to the payload 321 of the superframe is stored in the device ID 701.

The current value 702 represents the receiving power amount of a power receiving device 20 to which power is currently being transmitted by the power transmission device 10. The receiving power amount 3211 allocated to the payload 321 of the superframe is stored in the current value 702. The maximum value 703 is the maximum value of the receiving power amounts previously obtained from each of the power receiving devices 20. In other words, the maximum value 703 is the maximum value of past current values. The maximum value 703 is a value which the power transmission device 10 refers to when evaluating the power transmission efficiency, and is an example of a reference value.

Figure 8:
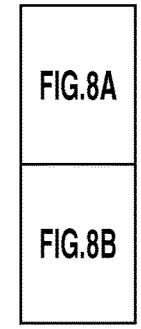
FIG. 8 (8A+8B) is a flowchart illustrating power transmission processing performed by the power transmission device.
Figure 8A:
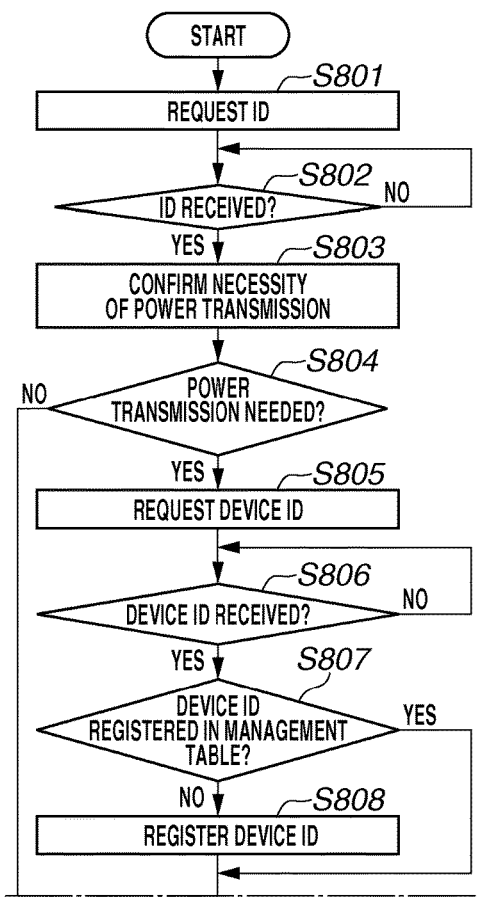
Figure 8B:
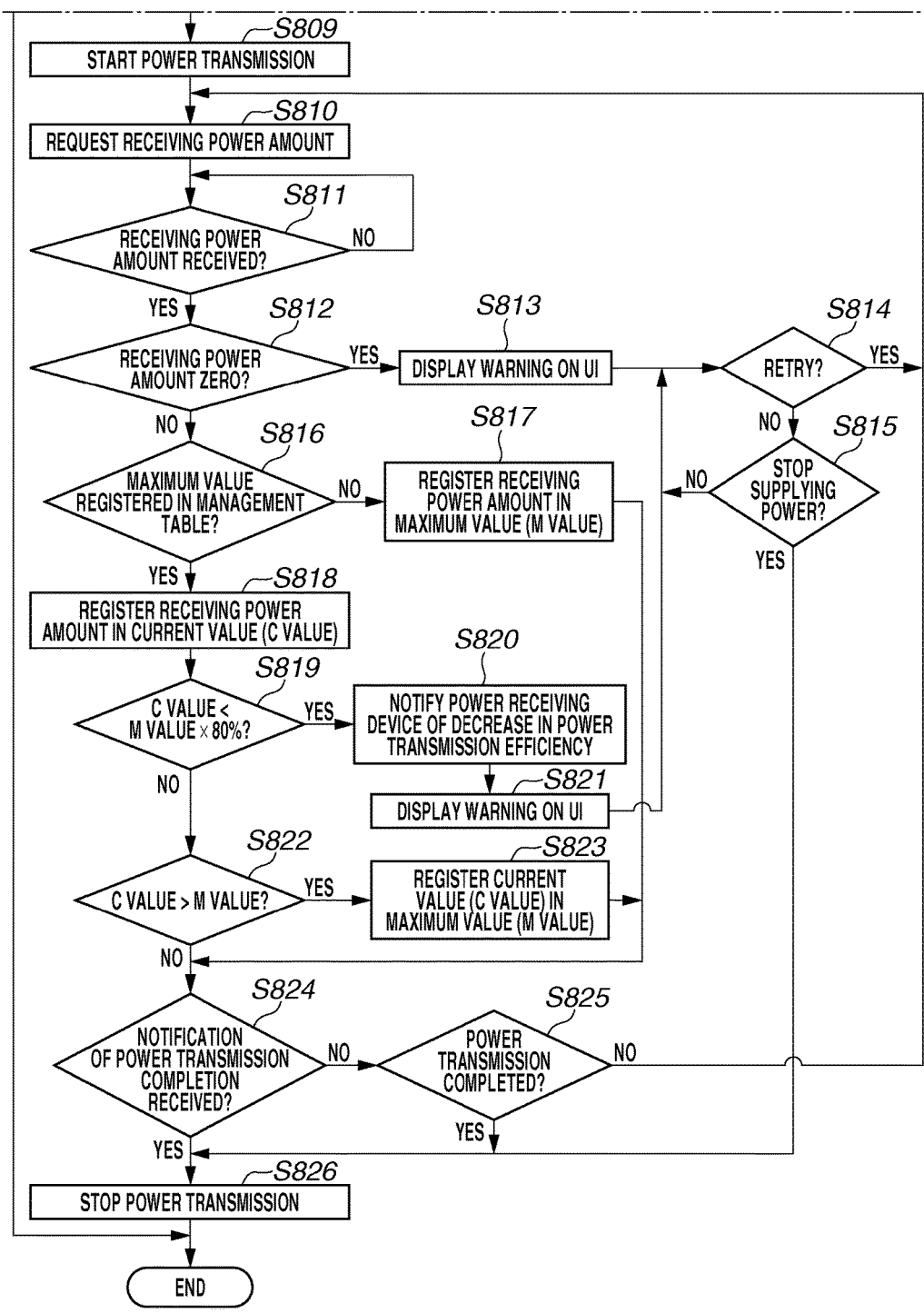

FIG. 8 is a flowchart illustrating power transmission processing performed by the power transmission device 10. First, in step S801, the CPU 111 of the power transmission device 10 requests the power receiving device 20 for the ID via the wireless transmission unit 120. Next, in step S802, if the CPU 111 receives the ID from the power receiving device 20 via the wireless receiving unit 130 (YES in step S802), the processing proceeds to step S803. In step S803, the CPU 111 confirms via the wireless transmission unit 120 whether the power receiving device 20 requires power.

Next, in step S804, if the CPU 111 receives from the power receiving device 20 via the wireless receiving unit 130 a notification of the necessity of power (YES in step S804), the processing proceeds to step S805. In step S805, the CPU 111 requests the power receiving device 20 for the device ID via the wireless transmission unit 120. In step S804, if the CPU 111 receives from the power receiving device 20 a notification of unnecessity of power (NO in step S804), the CPU 111 completes the power transmission processing.

In step S806, if the CPU 111 receives the device ID from the power receiving device 20 via the wireless receiving unit 130 (YES in step S806), the processing proceeds to step S807. In step S807, the CPU 111 confirms whether the received device ID is registered in the management table 700.

If the CPU 111 determines in step S807 that the received device ID is not registered in the management table 700 (NO in step S807), the processing proceeds to step S808. In step S808, the CPU 111 registers the received device ID in the management table 700, and the processing then proceeds to step S809.

If the CPU 111 determines in step S807 that the received device ID is registered in the management table 700 (YES in step S807), the processing proceeds to step S809. In step S809, the CPU 111 instructs the wireless transmission unit 120 to transmit power (power transmission control processing). In response, the wireless transmission unit 120 starts power transmission to the power receiving device 20 (power transmission processing).

Through the processing performed in steps S801 to S808, the association period (step S101) and the power transmission preparation period (step S102) are completed, and in step S809, the power transmission period (step S103) starts.

Next, in step S810, the CPU 111 transmits a receiving power amount request to the power receiving device 20 via the wireless transmission unit 120. This receiving power amount request is an example of a transmission request. Then, in step S811, if the CPU 111 receives the receiving power amount from the power receiving device 20 via the wireless receiving unit 130 (YES in step S111), the processing proceeds to step S812. In step S812, the CPU 111 compares the receiving power amount received from the power receiving device 20 with a reference value "0", and based on the comparison result, evaluates the power transmission efficiency (evaluation processing). Specifically, if the receiving power amount is equal to "0", the CPU 111 determines power cannot be transmitted.

Figure 9:
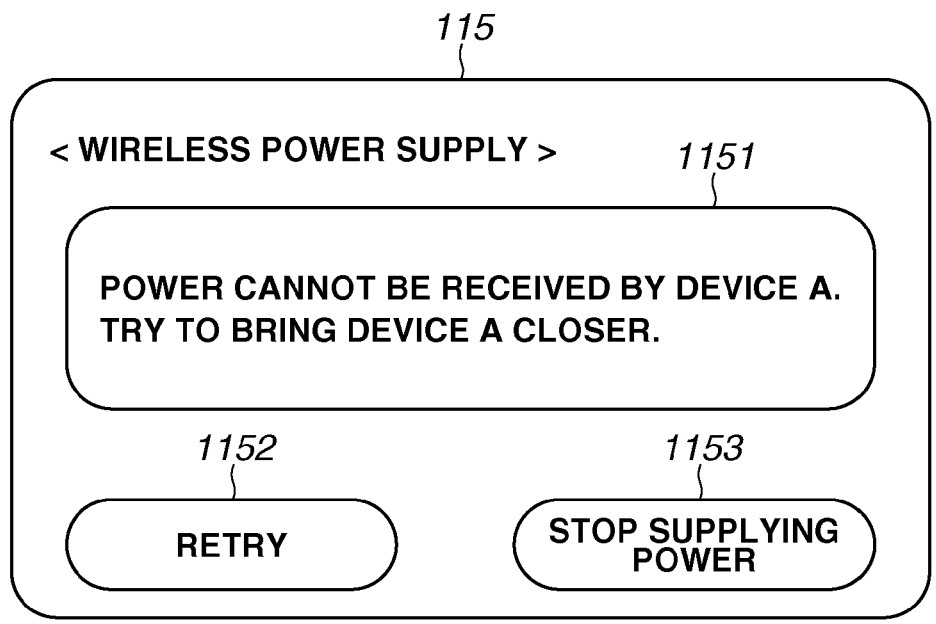
FIG. 9 illustrates a display example of a message indicating that power cannot be transmitted.

In step S812, if the receiving power amount is equal to "0" (YES in step S812), the processing proceeds to step S813. In step S813, the CPU 111 displays on the UI 115 an evaluation result indicating that power cannot be transmitted to the power receiving device 20 (display processing). FIG. 9 illustrates a display example of a message indicating that power cannot be transmitted.

In the example illustrated in FIG. 9, in addition to a message 1151 indicating that power cannot be transmitted, a retry area 1152 and a stop supplying power area 1153 are displayed on the liquid crystal display unit of the UI 115. The user of the power transmission device 10 can issue an instruction to retry or to stop the power supply by pressing the retry area 1152 or the stop supplying power area 1153, respectively.

Referring back to FIG. 8, in step S814, if the CPU 111 detects that the retry area 1152 of the UI 115 has been pressed (YES in step S814), the processing returns to step S810. On the other hand, if the CPU 111 detects in step S814 that the stop supplying power area 1153 of the UI 115 has been pressed (NO in step S814 and then YES in step S815), the processing proceeds to step S826.

In step S812, if the receiving power amount is not equal to "0" (NO in step S812), the processing proceeds to step S816. In step S816, the CPU 111 confirms whether the maximum value 703 corresponding to the device ID 701 of the power receiving device 20 to be processed is registered in the management table 700. In step S816, if the maximum value 703 is not registered (NO in step S816), the processing proceeds to step S817. In step S817, the CPU 111 registers the receiving power amount received in step S811 as the maximum value (M value) in the maximum value 703, and the processing then proceeds to step S824. The processing performed in step S817 is an example of reference value management processing for determining the received receiving power amount as the maximum value acting as a reference value.

Consequently, in the subsequent processing, namely, in the processing following the reception of the receiving power amount registered as the maximum value 703, the CPU 111 refers to the maximum value 703 registered by the processing in step S817.

In step S816, if the maximum value 703 is registered in the management table 700 (YES in step S816), the processing proceeds to step S818. In step S818, the CPU 111 registers the receiving power amount newly received in step S811 as the current value (C value) in the current value 702, and the processing proceeds to step S819.

In step S819, the CPU 111 evaluates the transmission efficiency (evaluation processing). Specifically, the CPU 111 compares the numerical value of the current value 702 in the management table 700 with a value that is 80% of the numerical value of the maximum value 703. If the numerical value of the current value 702 is less than the value that is 80% of the numerical value of the maximum value 703, the CPU 111 determines that the transmission efficiency has decreased.

In step S819, if the numerical value of the current value 702 is less than the value that is 80% of the numerical value of the maximum value 703 (YES in step S819), the processing proceeds to step S820. In step S820, the CPU 111 transmits to the power receiving device 20 an evaluation result indicating that the transmission efficiency has decreased (transmission processing), and the processing then proceeds to step S821.

Figure 10:
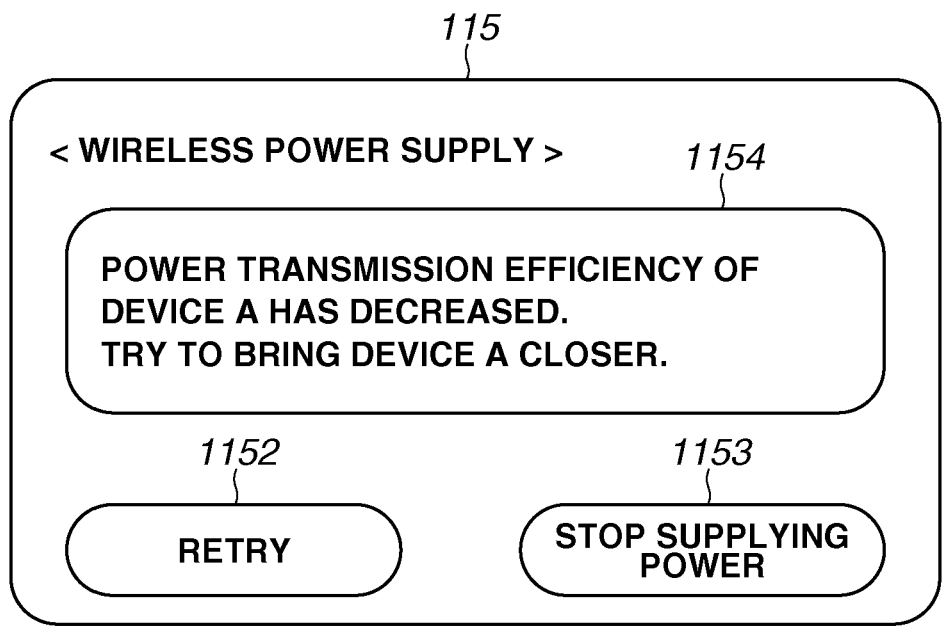
FIG. 10 illustrates a display example of a message indicating that transmission efficiency has decreased.

In step S821, the CPU 111 displays on the UI 115 a message indicating that the transmission efficiency of power to the power receiving device 20 has decreased (display processing), and the processing then proceeds to step S814. FIG. 10 illustrates a display example of a message indicating that transmission efficiency has decreased. A message 1154 indicating that the power transmission efficiency has decreased is displayed on the UI 115.

In the present exemplary embodiment, the value compared with the receiving power amount as the current value 702 has been described as a value 80% of the maximum value 703 as the reference value. However, the value that is compared with the receiving power amount may be any value that can be determined based on the numerical value of the maximum value 703, and is not limited to that described in the present exemplary embodiment.

As another example, the value compared with the receiving power amount may be set as the numerical value of the maximum value 703. In addition, as another example, this value may be set as a value that is 50% of the maximum value 703. In the evaluation processing performed in step S819, the evaluation method is not limited to that described in the present exemplary embodiment, and may be any method as long as the CPU 111 can evaluate the transmission efficiency based on the receiving power amount and a reference value.

In step S819, if the numerical value of the current value 702 is not less than the value that is 80% of the numerical value of the maximum value 703 (NO in step S819), the processing proceeds to step S822. In step S822, the CPU 111 compares the numerical value of the current value 702 and the numerical value of the maximum value 703 in the management table 700.

In step S822, if the numerical value of the current value 702 is greater than the numerical value of the maximum value 703 (YES in step S822), the processing proceeds to step S823. In step S823, the CPU 111 registers the current value 702 in the maximum value 703. In other words, the CPU 111 updates the maximum value 703 registered in step S817. Then, the processing proceeds to step S824. The processing in step S823 is an example of reference value management processing for updating the maximum value 703 acting as the reference value to the newly received receiving power amount.

In step S824, if the CPU 111 receives a notification of power transmission completion from the power receiving device 20 via the wireless receiving unit 130 (YES in step S824), the processing proceeds to step S826. In step S826, the CPU 111 stops the transmission of power to the power receiving device 20 from the wireless transmission unit 120.

In step S824, if the CPU 111 does not receive a notification of power transmission completion from the power receiving device 20 (NO in step S824), the processing proceeds to step S825. In step S825, the CPU 111 determines whether to complete power transmission. If the CPU 111 determines in step S825 to complete power transmission (YES in step S825), the processing proceeds to step S826. In step S826, the CPU 111 stops the transmission of power to the power receiving device 20 from the wireless transmission unit 120 to complete power transmission processing. If the CPU 111 determines in step S825 not to complete power transmission (NO in step S825), the processing returns to step S810.

Figure 11:
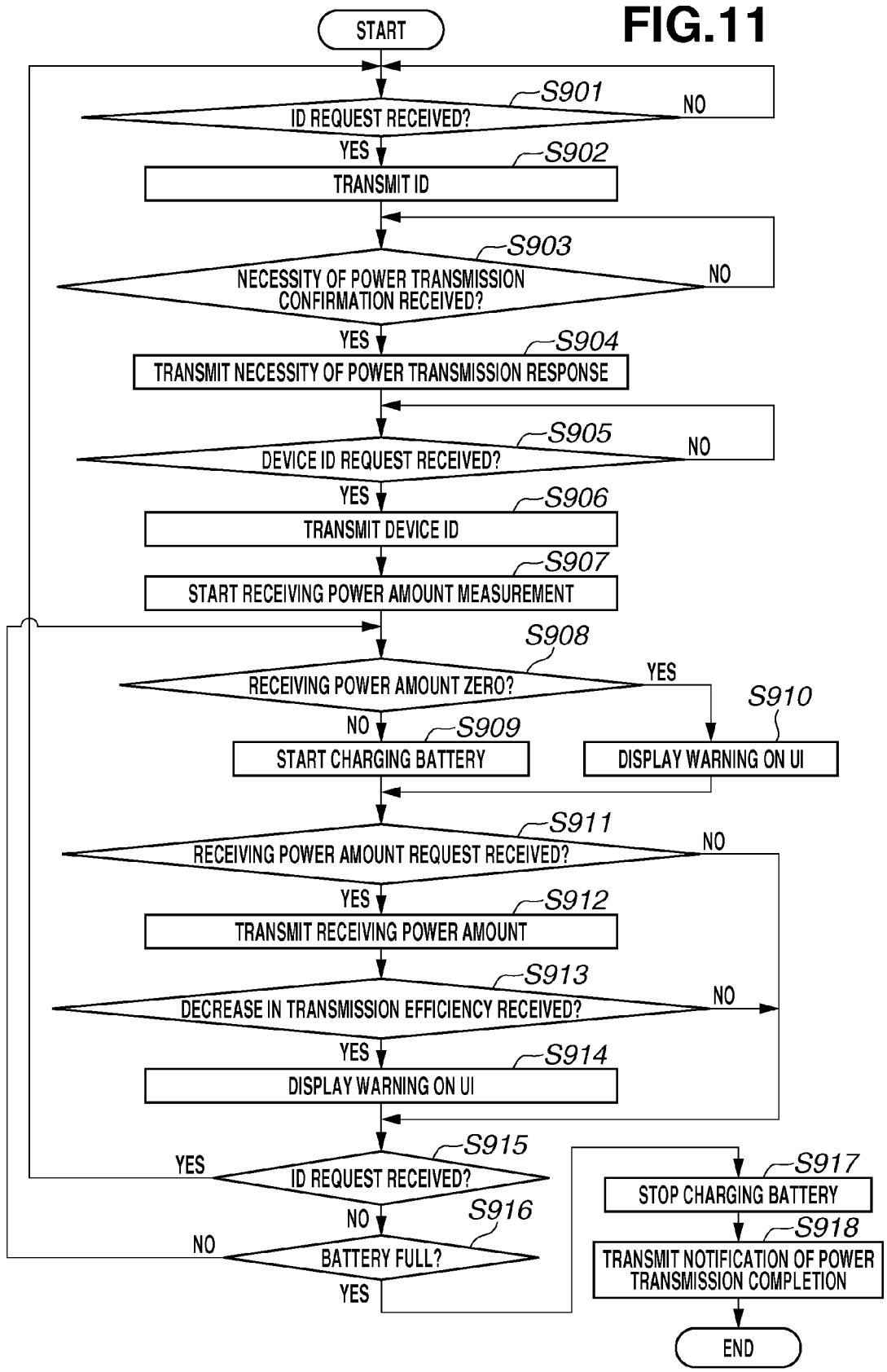
FIG. 11 is a flowchart illustrating power transmission processing performed by the power receiving device.

FIG. 11 is a flowchart illustrating power transmission processing performed by the power receiving device 20. In step S901, if the CPU 211 of the power receiving device 20 receives an ID request from the power transmission device 10 via the wireless receiving unit 230 (YES in step S901), the processing proceeds to step S902. In step S902, the CPU 211 transmits the ID to the power transmission device 10 via the wireless transmission unit 220.

Next, in step S903, if the CPU 211 receives the necessity of power transmission confirmation from the power transmission device 10 via the wireless receiving unit 230 (YES in step S903), the processing proceeds to step S904. In step S904, the CPU 211 notifies the power transmission device 10 of the necessity of power via the wireless transmission unit 220. Next, in step S905, if the CPU 211 receives the device ID request from the power transmission device 10 via the wireless receiving unit 230 (YES in step S905), the processing proceeds to step S906. In step S906, the CPU 211 transmits the device ID to the power transmission device 10 via the wireless transmission unit 220.

Through the processing performed in steps S901 to S906, the association period (step S101) and the power transmission preparation period (step S102) are completed, and the power transmission period (step S103) starts. When the power transmission period (step S103) starts, the transmission of power from the power transmission device 10 to the power receiving device 20 starts. In other words, the power receiving device 20 receives power supply from the power transmission device 10 (power reception processing). Then, in response to this, in step S907, the CPU 211 starts measurement of the receiving power amount received from the power transmission device 10, via the power measurement circuit 236.

Next, in step S908, the CPU 211 determines whether the receiving power amount measured in step S907 is equal to the reference value "0". If the receiving power amount is equal to "0" (YES in step S908), the processing proceeds to step S910. In step S910, the CPU 211 displays on the UI 215 a message indicating that power cannot be transmitted to the power receiving device 20, and the processing then proceeds to step S911.

Figure 12:
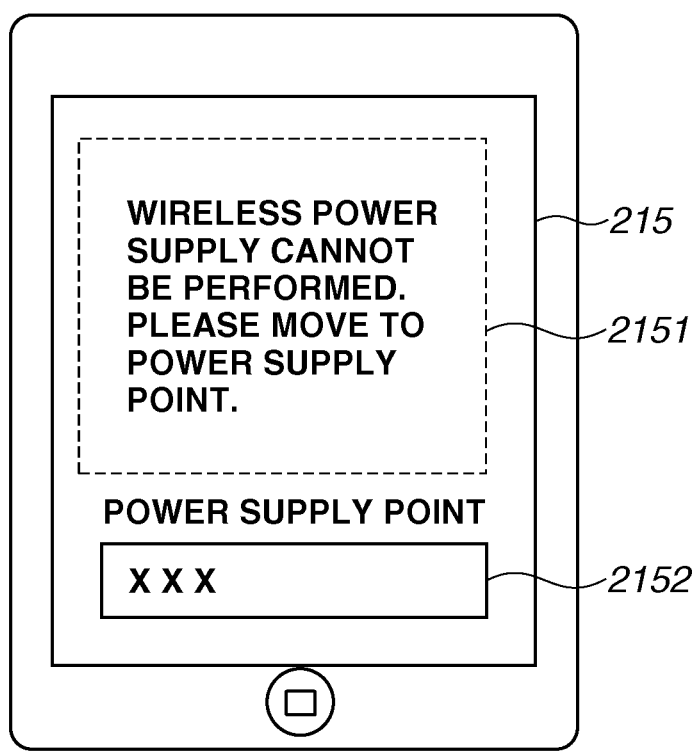
FIG. 12 illustrates a display example of a message indicating that power cannot be transmitted.

FIG. 12 illustrates a display example of a message indicating that power cannot be transmitted. In the example illustrated in FIG. 12, a message 2151 indicating that power cannot be transmitted and a power supply point 2152 are displayed on the liquid crystal display unit of the UI 215.

Referring back to FIG. 11, in step S908, if the receiving power amount is not equal to "0" (NO in step S908), the processing proceeds to step S909. In step S909, the CPU 211 starts charging of the battery 237, and the processing then proceeds to step S911.

In step S911, if the CPU 211 receives the receiving power amount request from the power transmission device 10 via the wireless receiving unit 230 (YES in step S911), the processing proceeds to step S912. In step S912, the CPU 211 transmits the receiving power amount measured by the power measurement circuit 236 to the power transmission device 10 via the wireless transmission unit 220 (transmission processing).

Figure 13:
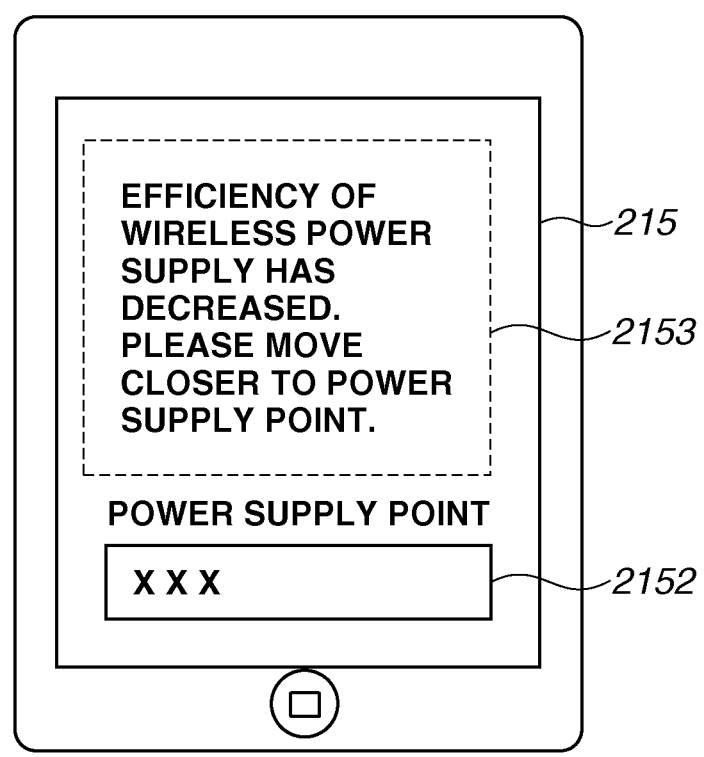
FIG. 13 illustrates a display example of a message indicating that transmission efficiency has decreased.

Next, in step S913, if the CPU 211 receives from the power transmission device 10 via the wireless receiving unit 230 an evaluation result indicating that the transmission efficiency has decreased (YES in step S913), the processing proceeds to step S914. The processing performed in step S913 is an example of reception processing for receiving an evaluation result. In step S914, the CPU 211 displays on the UI 215 a message indicating that the transmission efficiency to the power receiving device 20 has decreased (display processing). FIG. 13 illustrates a display example of a message indicating that transmission efficiency has decreased. A message 2153 indicating that the transmission efficiency is displayed on the UI 215.

Next, in step S915, if the CPU 211 receives the ID request from the power transmission device 10 via the wireless receiving unit 230 (YES in step S915), the processing returns to step S901. In step S915, if the CPU 211 does not receive the ID request (NO in step S915), the processing proceeds to step S916. In step S916, if the CPU 211 detects that the battery 237 is fully charged (YES in step S916), the processing proceeds to step S917. In step S916, if the battery 237 is not fully charged (NO in step S916, the processing returns to step S908.

In step S917, the CPU 211 stops charging of the battery 237. Next, in step S918, the CPU 211 transmits a notification of power transmission completion to the power transmission device 10 via the wireless transmission unit 220, and completes the power transmission processing.

Thus, the power transmission system according to the present exemplary embodiment evaluates transmission efficiency based on the actual receiving power amount of the power receiving device 20. Through this configuration, not only a decrease in the transmission efficiency caused by an increase in the distance between the power transmission device 10 and the power receiving device 20, but also a decrease in the transmission efficiency caused by the presence of obstacles between the power transmission device 10 and the power receiving device 20 can be detected.

Further, the power transmission system can promptly issue a notification to the user if a decrease in the transmission efficiency is detected. Consequently, the user can promptly take appropriate action such as moving the power receiving device 20 into the power supply area 30. Therefore, the power transmission system can improve transmission efficiency, and reduce wasteful power consumption.

As another example, the CPU 211 may continue power transmission if the battery 237 is fully charged. In this case, the CPU 211 may stop the charging of the battery 237, and use the transmitted power for a purpose other than charging of the battery 237.

Next, a power transmission system according to a second exemplary embodiment will be described. In a power transmission system according to the second exemplary embodiment, if a power transmission device 10 is supplying power to a plurality of power receiving devices 20, the power transmission device 10 evaluates the transmission efficiency to each power receiving device 20 based on the receiving power amount of each of the plurality of power receiving devices 20.

Figure 14:
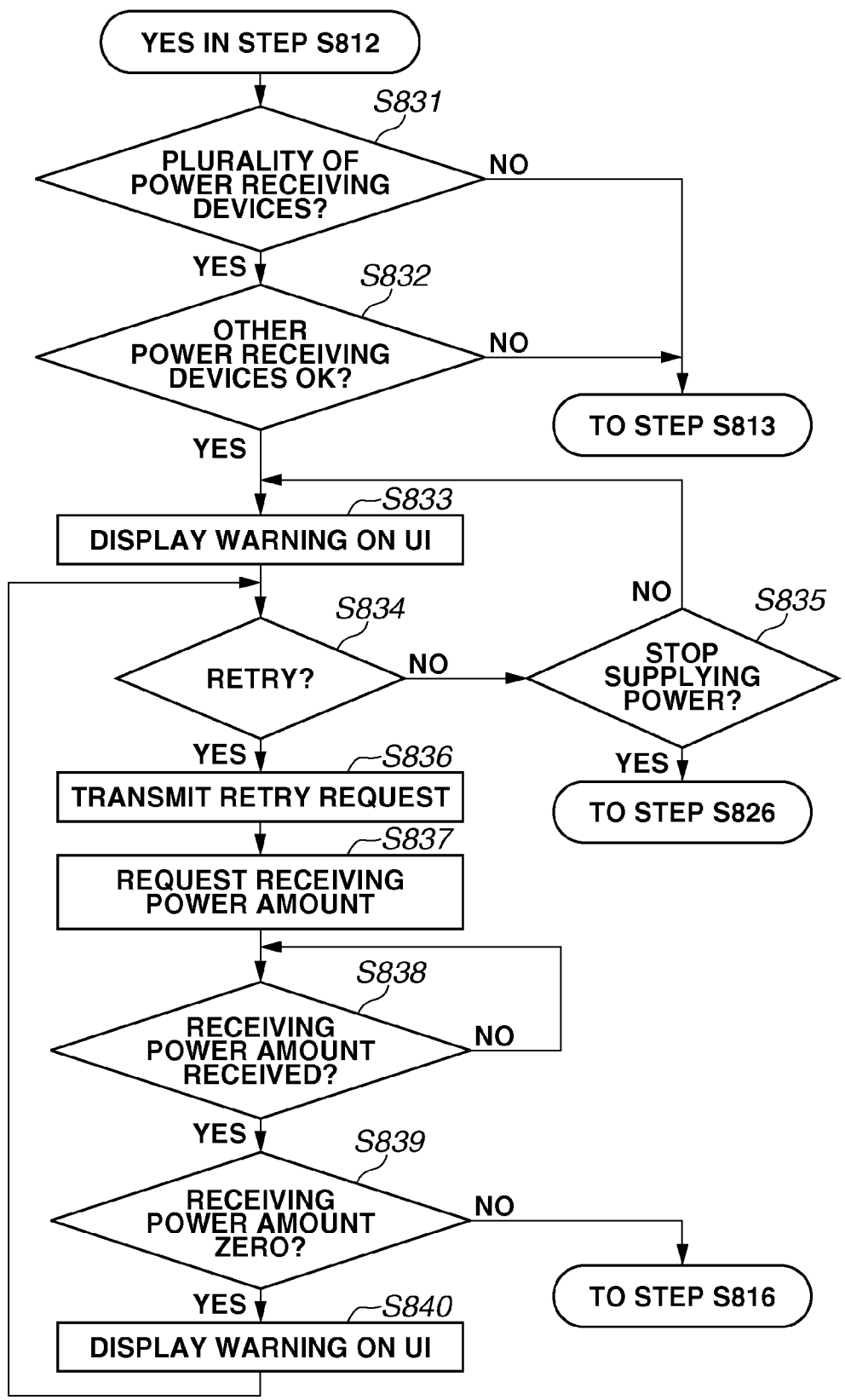
FIG. 14 is a flowchart illustrating power transmission processing performed by a power transmission device.

FIG. 14 is a flowchart illustrating power transmission processing performed by the power transmission device 10 according to the second exemplary embodiment. The power transmission device 10 according to the present exemplary embodiment performs similar processing to that performed in steps S801 to S812 of the power transmission processing performed by the power transmission device 10 according to the first exemplary embodiment (FIG. 8). In the present exemplary embodiment, however, in step S812, if the receiving power amount is equal to "0" (YES in step S812), the processing proceeds to step S831 illustrated in FIG. 14 instead of proceeding to S813 in FIG. 8.

In step S831, the CPU 111 confirms whether there is a plurality of power receiving devices 20 to which power is being transmitted. In step S831, if there is a plurality of power receiving devices 20 (YES in step S831), the processing proceeds to step S832. In step S832, the CPU 111 confirms whether the receiving power amount of the power receiving devices 20 (other power receiving devices 20) other than the power receiving device 20 to be processed (the power receiving device 20 determined in step S812 as having a receiving power amount of equal to "0") is equal to "0". Here, a value "0" is an example of a threshold.

In step S832, if the receiving power amounts of the other power receiving devices 20 are not equal to "0" (YES in step S832), the processing proceeds to step S833. In other words, if the receiving power amount of the power receiving device 20 to be processed is equal to or less than a threshold, and the receiving power amounts of the other power receiving devices 20 are more than the threshold, the processing proceeds to step S833.

Figure 15:
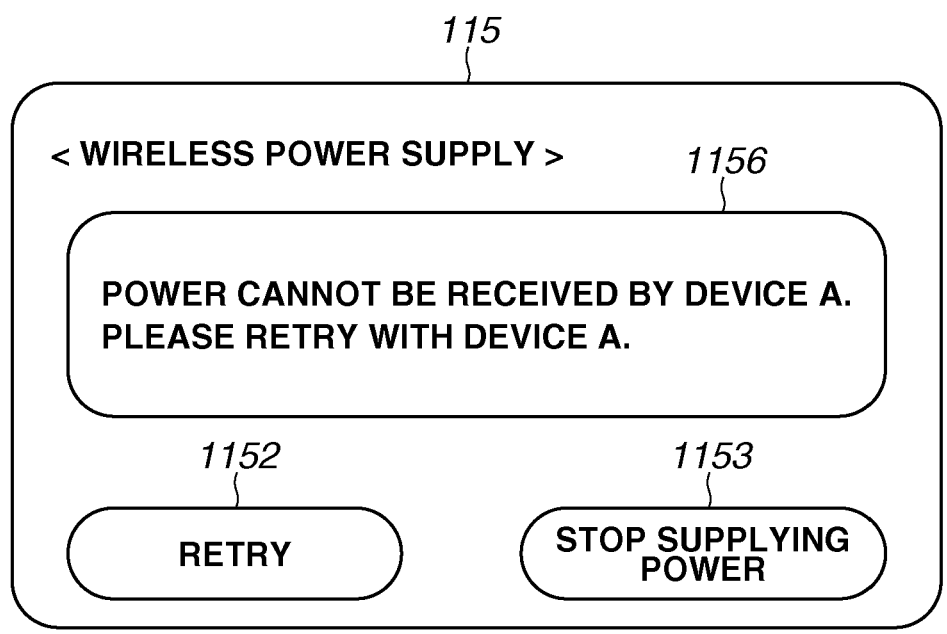
FIG. 15 illustrates a display example of a message indicating that power cannot be transmitted.

In step S833, the CPU 111 displays on the UI 115 a message indicating that power cannot be transmitted to the power receiving device 20, and the processing proceeds to step S834. FIG. 15 illustrates a display example of a message indicating that power cannot be transmitted. In the example illustrated in FIG. 15, a message 1156 indicating that power cannot be transmitted, a retry area 1152 and a stop supplying power area 1153 are displayed on the UI 115.

In step S831, if there is not a plurality of power receiving devices 20 (NO in step S831), the processing proceeds to step S813. Further, in step S832, if the receiving power amounts of the other power receiving devices 20 are equal to "0" (NO in step S832), the processing proceeds to step S813.

In step S834, if the CPU 111 detects that the retry area 1152 on the UI 115 has been pressed (YES in step S834), the processing proceeds to step S836. In step S834, if the CPU 111 detects that the stop supplying power area 1153 on the UI 115 has been pressed (NO in step S834 and then YES in step S835), the processing proceeds to step S826.

In step S836, the CPU 111 transmits a retry request to the power receiving device 20 via the wireless transmission unit 120. Next, in step S837, the CPU 111 transmits a receiving power amount request to the power receiving device 20 via the wireless transmission unit 120. Then, in step S838, if the CPU 111 receives the receiving power amount from the power receiving device 20 via the wireless receiving unit 130 (YES in step S838), the processing then proceeds to step S839. In step S839, the CPU 111 again confirms whether the receiving power amount is equal to "0".

Figure 16:
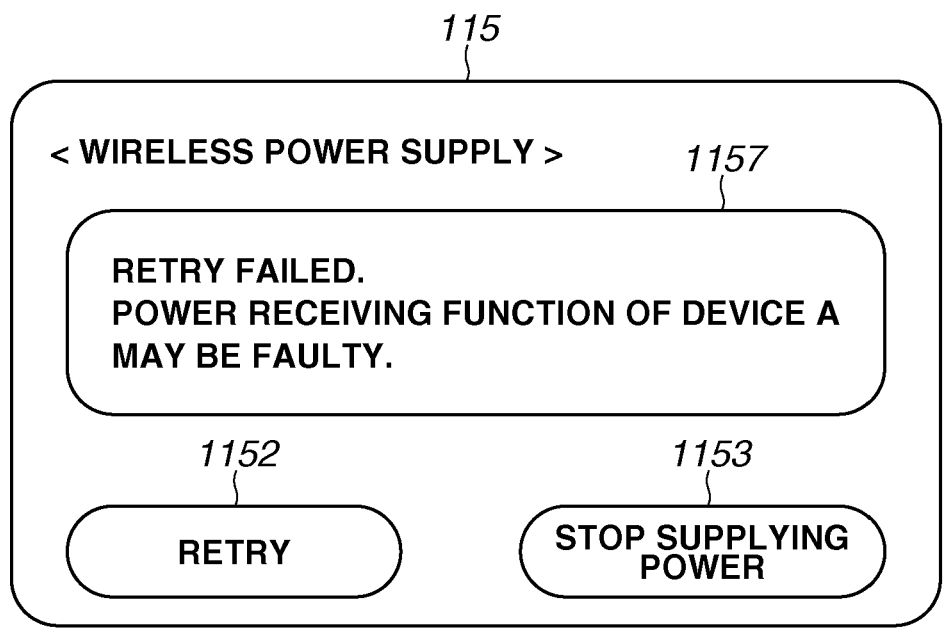
FIG. 16 illustrates a display example of a message indicating that there is a problem with a power receiving function.

In step S839, if the receiving power amount is equal to "0" (YES in step S839), the processing proceeds to step S840. In step S840, the CPU 111 displays on the UI 115 a message indicating that the power receiving device 20 has failed in the retry attempt, and that there is a problem with the power receiving function of the power receiving device 20. FIG. 16 illustrates a display example of a message indicating that there is a problem with the power receiving function. As illustrated in FIG. 16, a message 1157 indicating that there is a problem with the power receiving function is displayed on the UI 115. Consequently, the user can recognize that a problem with power reception has occurred.

In step S839, if the receiving power amount is not equal to "0" (NO in step S839), the processing proceeds to step S816. The processing in the other steps of the power transmission processing performed by the power transmission device 10 is similar to the processing in the corresponding step of the power transmission processing performed by the power transmission device 10 according to the first exemplary embodiment.

Figure 17:
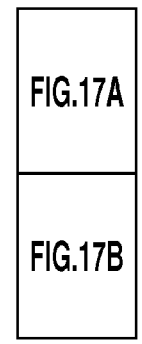
FIG. 17 (17A+17B) is a flowchart illustrating power transmission processing performed by a power receiving device.
Figure 17A:
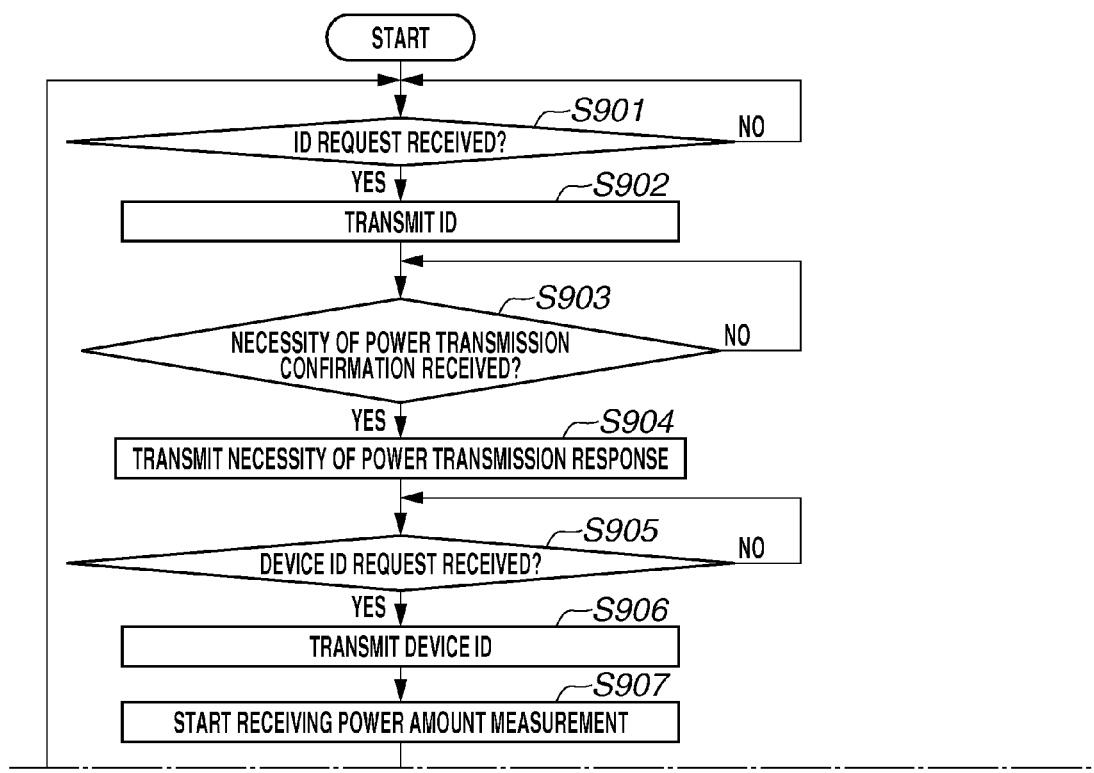
Figure 17B:
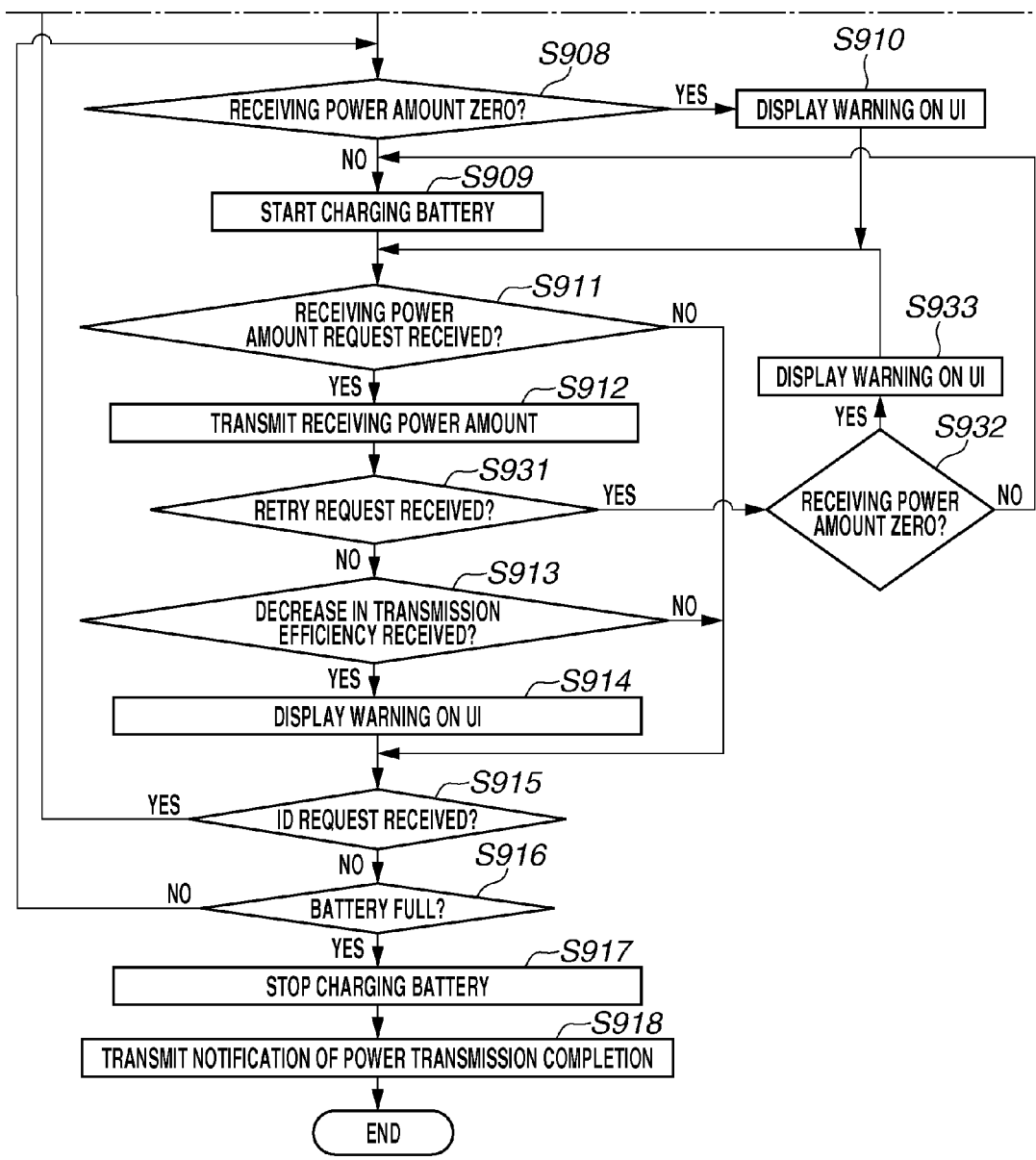

FIG. 17 is a flowchart illustrating power transmission processing performed by the power receiving device 20 according to the second exemplary embodiment. Similar steps to those performed in the power transmission processing according to the first exemplary embodiment (FIG. 11) are denoted with the same reference numerals, and a description thereof is omitted here.

The power receiving device 20 according to the second exemplary embodiment performs similar processing to that performed in steps S901 to S912 in the power transmission processing performed by the power receiving device 20 according to the first exemplary embodiment (FIG. 11). Then, after step S912, the processing proceeds to step S931 illustrated in FIG. 17.

In step S931, if the CPU 211 receives the retry request from the power transmission device 10 via the wireless receiving unit 230 (YES in step S931), the processing proceeds to step S932. In step S932, the CPU 211 again measures the receiving power amount, and determines whether the measured value is equal to "0".

Figure 18:
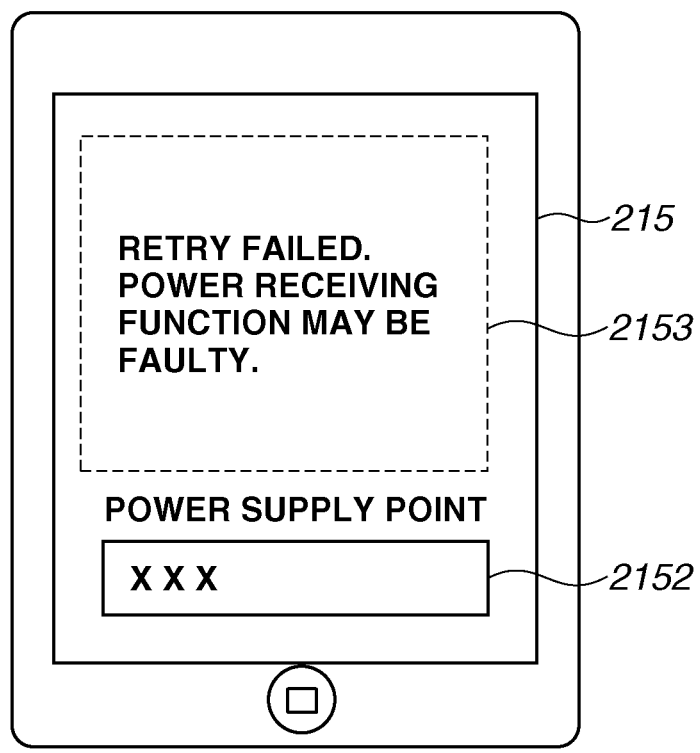
FIG. 18 illustrates a display example of a message indicating that there is a problem with a power receiving function.

In step S932, if the receiving power amount is equal to "0" (YES in step S932), the processing proceeds to step S933. In step S933, the CPU 211 displays on the UI 215 a message indicating that the power receiving device 20 has failed in the retry attempt and that there is a problem with the power receiving function, and the processing returns to step S911. FIG. 18 illustrates a display example of a message indicating that there is a problem with a power receiving function. As illustrated in FIG. 18, a message 2153 indicating that there is a problem with the power receiving function is displayed on the UI 215.

In step S932, if the receiving power amount is not equal to "0" (NO in step S932), the processing returns to step S909, and starts the charging of the battery 237. The processing in the other steps of the power transmission processing performed by the power receiving device 20 is similar to the processing in the corresponding step of the power transmission processing performed by the power receiving device 20 according to the first exemplary embodiment. Further, the configuration and processing other than this in the power transmission system according to the second exemplary embodiment is similar to those of the power transmission system according to the first exemplary embodiment.

Thus, in the power transmission system according to the second exemplary embodiment, when supplying power to a plurality of power receiving devices 20, the power transmission device 10 can evaluate transmission efficiency based on the receiving power amount of each of the plurality of power receiving devices 20. Consequently, if the transmission efficiency is low, the power transmission device 10 can determine whether the cause lies on the power receiving device 20 side or on the power transmission device 10 side.

For example, if the power receiving function of the power receiving device 20 is faulty, the transmission efficiency cannot be improved even if the distance between the power transmission device 10 and the power receiving device 20 is shortened. In such a case, in the power transmission system according to the second exemplary embodiment, an appropriate notification can be issued to the user. Therefore, when the user receives the notification, the user can take action such as requesting the power transmission device 10 to stop power supply. Consequently, the wasteful supply of power by the power transmission device 10 can be avoided. In other words, the efficiency of power transmission to the power receiving device 20 can be improved.

Next, a third exemplary embodiment will be described. In a power transmission system according to the third exemplary embodiment, a power transmission device 10 receives from a power receiving device 20 the power receiving capacity that the power receiving device 20 desires. This power receiving capacity represents information indicating a value of the receiving power amount that the power receiving device 20 desires. Further, the power transmission device 10 registers the value indicated by the power receiving capacity as the maximum value 703 in the management table 700.

Figure 19:
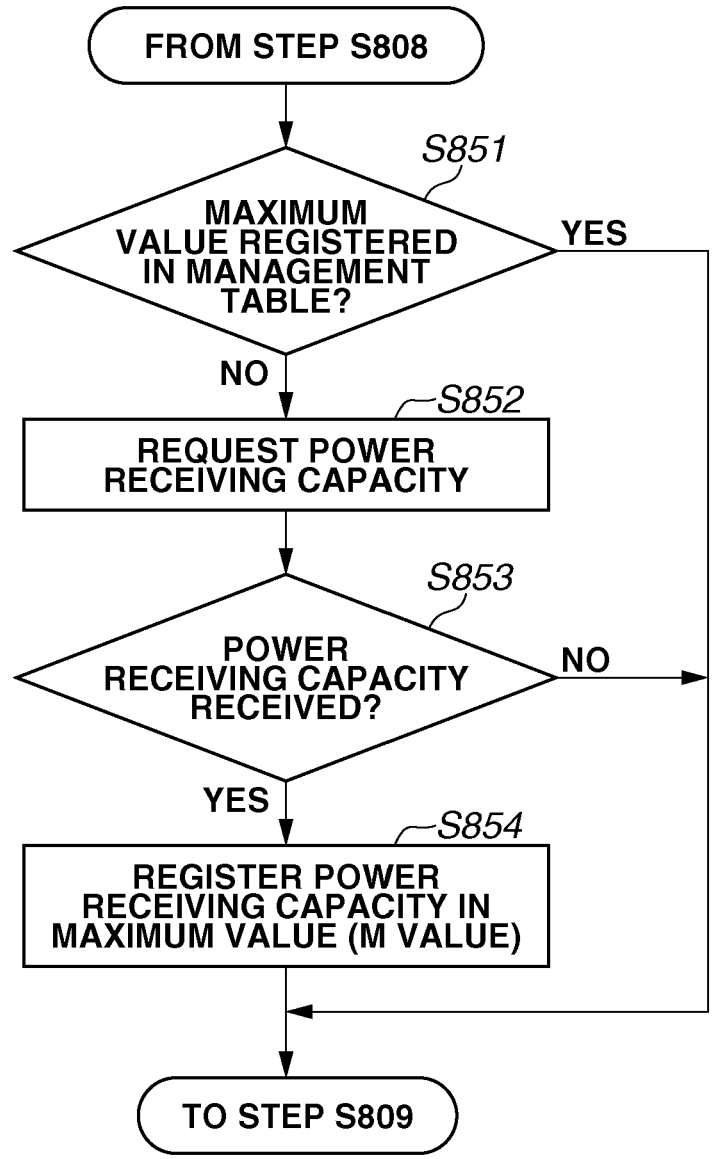
FIG. 19 is a flowchart illustrating power transmission processing performed by a power transmission device.

FIG. 19 is a flowchart illustrating power transmission processing performed by the power transmission device 10 according to the third exemplary embodiment. The power transmission device 10 according to the third exemplary embodiment performs similar processing to that performed in steps S801 to S808 of the power transmission processing performed by the power transmission device 10 according to the first exemplary embodiment (FIG. 8). Then, after the processing in step S808, the processing proceeds to step S851 illustrated in FIG. 19.

In step S851, the CPU 111 determines whether the maximum value 703 is registered in the management table 700. If the maximum value 703 is not registered in the management table 700 (NO in step S851), the processing proceeds to step S852. In step S852, the CPU 111 transmits a power receiving capacity request to the power receiving device 20 via the wireless transmission unit 120.

Next, in step S853, if the CPU 111 receives the power receiving capacity from the power receiving device 20 via the wireless receiving unit 130 (YES in step S853), the processing proceeds to step S854. In step S854, the CPU 111 registers the receiving power amount indicated by the received power receiving capacity in the maximum value 703 of the management table 700, and the processing then proceeds to step S809.

Figure 20:
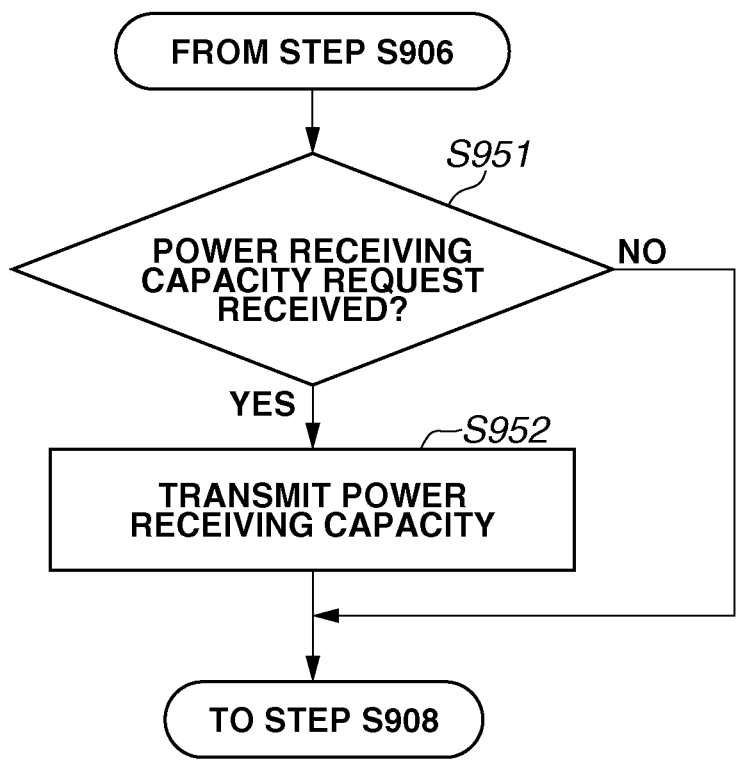
FIG. 20 is a flowchart illustrating power transmission processing performed by a power receiving device.

FIG. 20 is a flowchart illustrating power transmission processing performed by the power receiving device 20 according to the third exemplary embodiment. The power receiving device 20 according to the third exemplary embodiment performs similar processing to that performed in steps S901 to S906 of the power transmission processing performed by the power receiving device 20 according to the first exemplary embodiment (FIG. 11). Then, after the processing in step S906, the processing proceeds to step S951 illustrated in FIG. 20.

In step S951, if the CPU 211 receives the power receiving capacity request from the power transmission device 10 via the wireless receiving unit 230 (YES in step S951), the processing proceeds to step S952. In step S952, the CPU 211 transmits the power receiving capacity indicating the receiving power amount that it desires to the power transmission device 10 via the wireless transmission unit 220, and the processing then proceeds to step S908.

Thus, in the power transmission system according to the third exemplary embodiment, the power transmission device 10 receives the power receiving capacity before starting power transmission, and registers the received power receiving capacity in the maximum value 703. Therefore, the power transmission device 10 can evaluate transmission efficiency even if there is no power transmission history to the power receiving device 20 to which power is to be transmitted.

Further, the configuration and processing other than this in the power transmission system according to the third exemplary embodiment is similar to those of the power transmission system according to the other exemplary embodiments.

Next, a fourth exemplary embodiment will be described. In a power transmission system according to the fourth exemplary embodiment, communication is performed between a power transmission device 10 and a power receiving device 20 based on a wireless communication system other than a wireless charging standard communication system.

Figure 21:
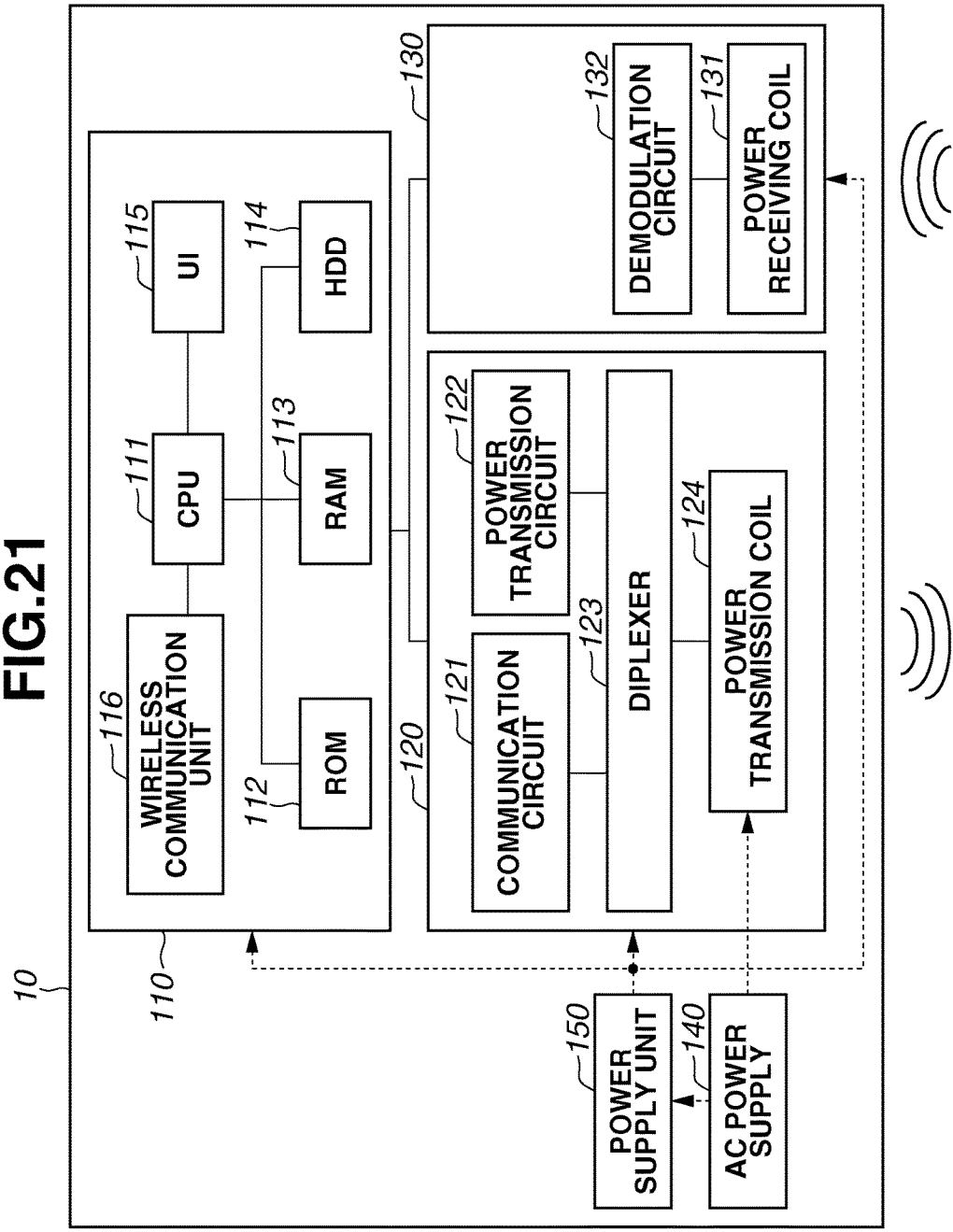
FIG. 21 illustrates a power transmission device.

FIG. 21 illustrates the power transmission device 10 according to the fourth exemplary embodiment. A control unit 110 of the power transmission device 10 according to the fourth exemplary embodiment further includes a wireless communication unit 116. The wireless communication unit 116 is a control circuit that supports a wireless standard such as Wi-Fi® or Bluetooth®, and performs network communication with an external device.

The power transmission device 10 can perform wireless communication with an external device via the wireless communication unit 116, separately to the communication performed via the wireless transmission unit 120 and the wireless receiving unit 130. In the present exemplary embodiment, a communication area in which communication can be performed via the wireless communication unit 116 is broader than the communication area 40 of the wireless transmission unit 120 and the wireless receiving unit 130. However, the communication distance of the wireless communication unit 116 is not limited to this.

FIG. 22 illustrates the power receiving device 20 according to the fourth exemplary embodiment. A control unit 210 of the power receiving device 20 according to the fourth exemplary embodiment further includes a wireless communication unit 216. The wireless communication unit 216 is a control circuit that supports the wireless standard of the power transmission device 10, and performs network communication with an external device.

The power receiving device 20 can perform wireless communication with an external device via the wireless communication unit 216, separately to the communication performed via the wireless receiving unit 230 and the wireless transmission unit 220. In the present exemplary embodiment, a communication area in which communication can be performed via the wireless communication unit 216 is broader than the communication area 40 of the wireless receiving unit 230 and the wireless transmission unit 220. However, the communication distance of the wireless communication unit 216 is not limited to this.

In the power transmission system according to the fourth exemplary embodiment, the transmitting and receiving of data in the power transmission processing (FIGS. 8 and 11) is performed via the wireless communication units 116 and 216.

In the superframe illustrated in FIG. 4, the power transmission system cannot perform the next processing until the previous superframe has been completed. In other words, when the power transmission device 10 is performing power transmission to one power receiving device 20, until that power transmission has been completed, communication with another power receiving device 20 cannot be performed in a case of communication based on the wireless charging standard.

However, since the power transmission system includes the wireless communication units 116 and 216 that perform wireless communication based on a standard other the wireless charging standard, the power transmission to one power receiving device 20 and the processing of the association period (step S101) with another power receiving device 20 can be performed in parallel.

Further, the configuration and processing other than this in the power transmission system according to the fourth exemplary embodiment is similar to those of the power transmission system according to the other exemplary embodiments.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2013-084240 filed Apr. 12, 2013, which is hereby incorporated by reference herein in its entirety.

What is claimed is:

1. A power transmission device comprising:
   a power transmitter that wirelessly transmits power to a power receiving device;
   a memory that stores instructions;
   a processor that executes the instructions to:
   acquire a receiving power amount from a specific power receiving device to which the power transmitter is transmitting power;
   determine whether the acquired receiving power amount is smaller than a reference value calculated based on a maximum value of receiving power amounts previously acquired from the specific power receiving device; and
   prompt, in a case where it is determined that the acquired receiving power amount is smaller than the reference value, a user to bring the specific power receiving device closer to the power transmission device.

2. The power transmission device according to claim 1, wherein, in a case where the acquired receiving power amount is smaller than the reference value, the processor displays a first message for prompting a user to bring the specific power receiving device closer to the power transmission device.

3. The power transmission device according to claim 2, wherein, in a case where the acquired receiving power amount is zero, the processor displays a second message different from the first message.

4. The power transmission device according to claim 3, wherein the second message is a message indicating that the specific power receiving device has not received power.

5. A power transmission method executed by a power transmission device, the method comprising:
- wirelessly transmitting power to a power receiving device;
- acquiring a receiving power amount from a specific power receiving device to which the power transmitter is transmitting power;
- determining whether the acquired receiving power amount is smaller than a reference value calculated based on a maximum value of receiving power amounts previously acquired from the specific power receiving device; and
- prompting, in a case where it is determined that the acquired receiving power amount is smaller than the reference value, a user to bring the specific power receiving device closer to the power transmission device.

6. A non-transitory computer-readable storage medium storing computer executable instructions that cause a computer to execute a power transmission method, the method comprising:
- wirelessly transmitting power to a power receiving device;
- acquiring a receiving power amount from a specific power receiving device to which the power transmitter is transmitting power;
- determining whether the acquired receiving power amount is smaller than a reference value calculated based on a maximum value of receiving power amounts previously acquired from the specific power receiving device; and
- prompting, in a case where it is determined that the acquired receiving power amount is smaller than the reference value, a user to bring the specific power receiving device closer to the power transmission device.

* * * * *